(12) United States Patent
Perng et al.

(10) Patent No.: US 7,783,694 B2
(45) Date of Patent: Aug. 24, 2010

(54) IDENTIFICATION OF RELEVANT METRICS

(75) Inventors: Chang-Shing Perng, Goldens Bridge, NY (US); Steve Lin, Florham Park, NJ (US); Sheng Ma, Briarcliff Manor, NY (US); David Thoenen, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 11/433,205

(22) Filed: May 12, 2006

(65) Prior Publication Data

US 2007/0263550 A1 Nov. 15, 2007

(51) Int. Cl.
*G06F 17/15* (2006.01)
(52) U.S. Cl. .................................................. 708/422
(58) Field of Classification Search ......... 708/422–426, 708/200–209, 446
See application file for complete search history.

(56) References Cited

U.S. PATENT DOCUMENTS

| | | | | |
|---|---|---|---|---|
| 5,020,113 A | * | 5/1991 | Lo et al. | 708/422 |
| 5,915,036 A | * | 6/1999 | Grunkin et al. | 382/132 |
| 6,064,768 A | * | 5/2000 | Hajj et al. | 708/422 |
| 7,117,108 B2 | * | 10/2006 | Rapp et al. | 702/71 |
| 7,557,805 B2 | * | 7/2009 | Wong et al. | 345/440 |
| 2002/0077756 A1 | * | 6/2002 | Arouh et al. | 702/20 |
| 2002/0161736 A1 | * | 10/2002 | Beygelzimer et al. | 707/1 |
| 2002/0169562 A1 | * | 11/2002 | Stephanopoulos et al. | 702/19 |
| 2005/0197875 A1 | * | 9/2005 | Kauffman | 705/7 |

* cited by examiner

*Primary Examiner*—Chat C Do
(74) *Attorney, Agent, or Firm*—Jon A. Gibbons; Fleit Gibbons Gutman Bongini & Bianco P.L.

(57) ABSTRACT

A method and system for identifying relevant metrics among metrics that are measured to determine conformance with a service level agreement. The method includes selecting two sets of points, each set representing a given number of measurements for an individual metric and setting a separate threshold for each of the sets of points. The threshold values are selected to produce a set of quadrants so as to maximize distribution of points of intersection of each of the sets of points between a second quadrant and a fourth quadrant in a four-quadrant graph. The method can be performed on a computer system.

15 Claims, 9 Drawing Sheets

| | 1 | 2 | 3 | 4 | 5 | 7 | 8 | 9 | 10 | 11 | 12 | 13 | 14 | 15 | 16 | 17 | 18 | 20 | 21 | 22 | 24 |
|---|---|---|---|---|---|---|---|---|---|---|---|---|---|---|---|---|---|---|---|---|---|
| 1. Host96_r AvalMem | | .23 | .74 | .27 | .66 | -.06 | .45 | .26 | -.05 | -.34 | .69 | -.48 | .85 | .23 | .45 | .33 | .07 | -.01 | -.08 | .21 | .64 |
| 2. Host84_r OpnFileCnt | .23 | | .36 | .95 | .44 | -.19 | .37 | .81 | .19 | -.52 | .26 | -.35 | .34 | .83 | .37 | .78 | -.22 | -.18 | -.16 | .88 | .28 |
| 3. BckupServ2 RspnsT... | .74 | 0.36 | | .38 | .75 | -.12 | .52 | .36 | -.12 | -.39 | .74 | -.51 | .87 | .37 | .52 | .35 | -.14 | -.06 | -.02 | .34 | .67 |
| 4. WebServ3 RspnsTme | .27 | .95 | .38 | | .36 | -.15 | .44 | .85 | -.16 | -.56 | .28 | -.43 | .39 | .84 | .44 | .84 | -.18 | -.15 | -.14 | .89 | .33 |
| 5. Host25_r OpnFileCnt | .66 | .44 | .75 | .36 | | -.03 | .47 | .36 | -.03 | -.36 | .69 | -.51 | .82 | .28 | .47 | .34 | -.08 | .0 | -.03 | .25 | .65 |
| 7. WebServ1 RspnsTme | -.06 | -.19 | -.12 | -.15 | -.03 | | -.22 | -.1 | .99 | .0 | -.05 | .02 | -.06 | -.19 | -.22 | -.13 | .95 | .93 | .97 | -.19 | -.08 |
| 8. Host 54_n HandleCnt | .45 | .37 | .52 | .44 | .47 | -.22 | | .41 | -.22 | -.66 | .44 | -.36 | .56 | .34 | 1.0 | .39 | -.23 | -.17 | -.21 | .29 | .49 |
| 9. BckupServ4 ThruPut | .26 | .81 | .36 | .85 | .36 | -.1 | .41 | | -.1 | -.51 | .55 | -.44 | .38 | .68 | .41 | .7 | -.12 | -.09 | -.09 | .71 | .32 |
| 10. BckupServ0 ThruPut | -.05 | -.19 | -.12 | -.16 | -.03 | .99 | -.22 | -.1 | | .0 | -.04 | .02 | -.07 | -.2 | -.22 | -.12 | .94 | .93 | .96 | -.2 | -.07 |
| 11. Host_59_n HandleCnt | -.34 | -.52 | -.39 | -.56 | -.36 | .0 | -.66 | -.51 | .0 | | -.35 | .67 | -.44 | -.46 | -.66 | -.5 | .04 | .0 | .0 | -.48 | -.59 |
| 12. BckupServ3 ThruPut | .69 | .26 | .74 | .28 | .69 | -.05 | .44 | .55 | -.04 | -.35 | | -.5 | .83 | .2 | .44 | .29 | -.07 | .0 | -.05 | .19 | .64 |
| 13. Host31_n MQLen | -.48 | -.35 | -.51 | -.43 | -.51 | .02 | -.36 | -.44 | .02 | .67 | -.5 | | -.57 | -.29 | -.36 | -.38 | .04 | -.01 | .03 | -.24 | -.49 |
| 14. WebServ2 RspnsT... | .85 | .34 | .87 | .39 | .82 | -.08 | .56 | .38 | -.07 | -.44 | .83 | -.57 | | .33 | .56 | .42 | -.11 | -.03 | -.1 | .31 | .77 |
| 15. Host72_r OpnFileCnt | .23 | .83 | .37 | .84 | .28 | -.19 | .34 | .68 | -.2 | -.46 | .2 | -.29 | .33 | | .34 | .72 | -.22 | -.18 | -.16 | .97 | .26 |
| 16. Host31_n CPU_util | .45 | .37 | .52 | .44 | .47 | -.22 | 1.0 | .41 | -.22 | -.66 | .44 | -.36 | .56 | .34 | | .39 | -.23 | -.17 | -.21 | .29 | .49 |
| 17. BckupServ5 Rspns... | .33 | .78 | .35 | .84 | .34 | -.13 | .39 | .7 | -.12 | -.5 | .29 | -.38 | .42 | .72 | .39 | | -.14 | -.1 | -.14 | .74 | .33 |
| 20. Host51_r PrcsCnt | .07 | -.22 | -.14 | -.18 | -.08 | .95 | -.23 | -.12 | .94 | .04 | -.07 | .04 | -.11 | -.22 | -.23 | -.14 | | .88 | .91 | -.22 | -.11 |
| 20. Host59_r TCP_cnn... | -.01 | -.18 | -.06 | -.15 | .0 | .93 | -.17 | -.09 | .93 | .0 | .0 | -.01 | -.03 | -.18 | -.17 | -.1 | .88 | | .9 | -.18 | -.03 |
| 21. BckupServ1 Rspns... | -.08 | -.16 | -.02 | -.14 | -.03 | .97 | -.21 | -.09 | .96 | .0 | -.05 | .03 | -.1 | -.16 | -.21 | -.14 | .91 | .9 | | -.16 | -.1 |
| 22. Host2_r OpenFileCnt | .21 | .88 | .34 | .89 | .25 | -.19 | .29 | .71 | -.2 | -.48 | .19 | -.24 | .31 | .97 | .29 | .74 | -.22 | -.18 | -.16 | | .26 |
| 24. Host20_r MQLen | .64 | .28 | .67 | .33 | .65 | -.06 | .49 | .32 | -.07 | -.39 | .64 | -.19 | .27 | .26 | .49 | .33 | -.11 | -.03 | -.1 | .26 | |

FIG. 9

| | 227 | 235 | 241 | 243 | 247 | 249 | 251 | 253 | 255 | 226 | 217 | 221 | 224 | 225 | 222 | 213 | 214 | 257 | 258 | 151 | 82 | 79 |
|---|---|---|---|---|---|---|---|---|---|---|---|---|---|---|---|---|---|---|---|---|---|---|
| 227. d25ml00 notes-c... | | .31 | .5 | .5 | .5 | .41 | .41 | .5 | .5 | .21 | -.01 | .0 | .0 | .0 | .0 | .0 | .0 | .0 | .0 | .0 | .0 | .0 |
| 235. d25ml04 notes-c... | .31 | | .38 | .35 | .31 | .26 | .26 | .31 | .31 | .3 | .18 | .0 | .0 | .0 | .0 | .0 | .0 | .0 | -.01 | -.01 | -.01 | .0 |
| 241. d25rsc01 notes-c... | .5 | .38 | | .58 | .5 | .41 | .41 | .5 | .5 | .21 | -.01 | .0 | .0 | .0 | .0 | .0 | .0 | .0 | .0 | .0 | .0 | .0 |
| 243. d25db01 notes-c... | .5 | .35 | .58 | | .58 | .41 | .41 | .5 | .5 | .21 | -.01 | .0 | .0 | .0 | .0 | .0 | .0 | .0 | .0 | .0 | .0 | .0 |
| 247. d25web1 notes-c... | .5 | .31 | .5 | .58 | | .52 | .41 | .5 | .5 | .21 | -.01 | .0 | .0 | .0 | .0 | .0 | .0 | .0 | .0 | .0 | .0 | .0 |
| 249. t25hub01 notes-c... | .41 | .26 | .41 | .41 | .52 | | .36 | .41 | .41 | .16 | .0 | .0 | .0 | .0 | .0 | .0 | .0 | .0 | .0 | -.01 | .0 | .0 |
| 251. t25snd01 notes-c... | .41 | .26 | .41 | .41 | .41 | .36 | | .41 | .41 | .16 | -.01 | .0 | .0 | .0 | .0 | .0 | .0 | .0 | .0 | -.01 | -.07 | .13 |
| 253. t25snd02 notes-c... | .5 | .31 | .5 | .5 | .5 | .41 | .41 | | .58 | .21 | -.01 | .0 | .0 | .0 | .0 | .0 | .0 | .0 | .0 | .0 | .0 | .0 |
| 255. t25snd04 notes-c... | .5 | .31 | .5 | .5 | .5 | .41 | .41 | .58 | | .21 | -.01 | .0 | .0 | .0 | .0 | .0 | .0 | .0 | .0 | .0 | .0 | .0 |
| 226. Notes_Torolab n... | .21 | .3 | .21 | .21 | .21 | .16 | .16 | .21 | .21 | | .09 | .1 | .06 | -.01 | .04 | -.06 | -.01 | -.03 | -.03 | .0 | -.06 | .1 |
| 217. aix#torns2 dns-l... | -0.1 | .18 | -.01 | -.01 | -.01 | .0 | -.01 | -.01 | -.01 | .09 | | .08 | .15 | .07 | .03 | .0 | .0 | -.01 | .05 | .02 | .03 | -.01 |
| 221. cmvcsrv1#torns... | .0 | .0 | .0 | .0 | .0 | .0 | .0 | .0 | .0 | .1 | .08 | | .08 | .03 | .14 | .0 | -.01 | .0 | .0 | .18 | .1 | -.02 |
| 224. toraix1#torns2 d... | .0 | .0 | .0 | .0 | .0 | .0 | .0 | .0 | .0 | .06 | .15 | .08 | | .0 | .25 | .0 | .0 | -.01 | .0 | .1 | .06 | -.01 |
| 225. toraix1#torns3 d... | .0 | .0 | .0 | .0 | .0 | .0 | .0 | .0 | .0 | -.01 | .07 | .03 | .0 | | -.03 | -.06 | -.02 | .0 | -.02 | -.01 | -.07 | .0 |
| 222. dns_torolab dns-... | .0 | .0 | .0 | .0 | .0 | .0 | .0 | .0 | .0 | .04 | .03 | .14 | .25 | .03 | | .0 | .0 | -.01 | -.01 | .32 | .05 | -.01 |
| 213. dhcpsrv4 dhcp-L... | .0 | .0 | .0 | .0 | .0 | .0 | .0 | .0 | .0 | -.06 | .0 | .0 | .0 | -.06 | .0 | | .02 | -.02 | -.02 | -.04 | .02 | -.01 |
| 214. dhcpsrv5 dhcp-L... | .0 | .0 | .0 | .0 | .0 | .0 | .0 | .0 | .0 | -.01 | .0 | -.01 | .0 | -.02 | .0 | .02 | | .47 | -.02 | .0 | -.02 | -.01 |
| 257. dhcpsrv5 dhcp-L... | .0 | .0 | .0 | .0 | .0 | .0 | .0 | .0 | .0 | -.03 | -.01 | .0 | -.01 | .0 | -.01 | -.02 | .47 | | .07 | -.01 | .0 | .02 |
| 258. dhcpsrv4 dhcp-L... | .0 | -0.1 | .0 | .0 | .0 | .0 | .0 | .0 | .0 | -.03 | .05 | .0 | .0 | -.02 | -.01 | -.02 | -.02 | .07 | | -.02 | .0 | .0 |
| 151. default dhcp-Bro... | .0 | -0.1 | .0 | .0 | .0 | -0.1 | -0.1 | .0 | .0 | .0 | .02 | .18 | .1 | -.01 | .32 | -.04 | .0 | -.01 | -.02 | | .0 | .0 |
| 82. d25ml02 prcIdleTi... | .0 | 0.1 | .0 | .0 | .0 | .0 | -.07 | .0 | .0 | -.06 | .03 | .1 | .06 | -.07 | .05 | .02 | -.02 | .0 | .0 | .0 | | -.54 |
| 79. d25ml02 loadAvg5... | .0 | .0 | .0 | .0 | .0 | .0 | .13 | .0 | .0 | .1 | -.01 | -.02 | -.01 | .0 | -.01 | -.01 | -.01 | .02 | .0 | .0 | -.54 | |

*FIG. 10*     1000

IDENTIFICATION OF RELEVANT METRICS

FIELD OF THE INVENTION

The present invention relates generally to service level agreements, and, in particular, to identifying and removing redundant metrics.

BACKGROUND OF THE INVENTION

A Service Level Agreement (SLA) is an agreement between a user and a service provider, defining the nature of the service provided and establishing a set of metrics (measurements) to be used to measure the level of service provided, measured against the agreed level of service. Such service levels might include provisioning (when the service is meant to be up and running), average availability, restoration times for outages, availability, average and maximum periods of outage, average and maximum response times, latency, delivery rates (e.g. average and minimum throughput), and others. The SLA also typically establishes trouble-reporting procedures, escalation procedures, and penalties for not meeting the level of service demanded—typically refunds to the user.

Various root-cause analysis methods and event correlation technologies have been developed for the purpose of monitoring failures of SLAs. Service Level Management (SLM) is a suite of software tools that provide both the end user organization and the service provider a means of managing the committed service levels defined in a SLA. SLM includes monitoring and gathering performance data, analyzing that data against committed performance levels, taking the appropriate actions to resolve discrepancies between committed and actual performance levels, and trending and reporting. SLM is difficult, especially across a wide range of complex technologies (i.e., Frame Relay and ATM) in a multi-site enterprise.

SLM typically deals with at least the following five fundamental issues:

1. Service Metric Selection: Monitoring service level metrics requires both human and machine resources. Monitoring designers generally lack the ability to choose a set of metrics that is minimal and sufficiently effective. One way metric selection can be done is by removing redundant metrics that contain information that can be inferred. As with any data-driven methodology, inference or induction can only be made on entities that have previously been observed. Therefore, the selection of metrics to be monitored is actually a reduction of metrics that have already been monitored.

2. Service Breach Point Selection: An important part of an SLA is the thresholds that separate unacceptable service quality from acceptable service quality. Setting breach values is usually regarded as a subjective or even political matter. Nevertheless, historical data can provide invaluable insight in understanding the existing system capacity and help users to make educated decisions.

3. Resource Metric Selection: A "resource" is any element of a computing system or operating system required by a job or task, including memory, input/output devices, processing units, data files, and control or processing programs. The number of resource metrics is usually at least a magnitude higher than the number of service metrics. Therefore, reducing the number of resource metrics to monitor can significantly lower the cost. As the information infrastructures become extremely complex, it is advantageous to discover the critical resources that support a particular service in terms of their performance dependency. Knowing the relationship enables the system administrators to better interpret the implication of changes in resource utilization. Additionally, the number of metrics to be monitored and managed can be further reduced.

4. Monitoring Threshold Selection: In resource monitoring, alerts are usually generated when the metric values exceed or fall below certain thresholds. For example, an alert is generated when free disk space is less than 15% of the total disk space. However, there is no clear rule defining what the correct threshold values should be. However, the consequence of having non-optimal threshold values is either generating too many alerts or missing emerging service degradation. Unlike setting service breach points, resource monitoring threshold can only be objectively discovered.

5. Bottleneck Resource Identification: Among all the IT resources that support a service, usually there are a few of them that can be called "bottleneck" resources because their metrics show stronger relevance to the service level. For example, a critical server may be equipped with an inadequate amount of memory. In this situation, a memory upgrade may significantly improve the service level. It is useful then, to identify the most likely bottleneck resources for both resource planning and monitoring purpose.

Time series metric analysis has been intensively studied in the past, especially in financial data analysis. This work can be regarded as an application of time-series data analysis. However, several intrinsic challenges have not been addressed adequately in the prior art. Examples of these are as follows.

1. Asynchronous data collection and irregular time series: In the application of managing distributed systems and applications, the data collection and monitoring are done in a distributed manner. That is, metrics collected from different devices may have very different sampling time and sampling durations. The classic algorithms can not handle such asynchronous time series directly.

2. Relevance analysis: The classical correlation analysis of two time series typically assumes that the relationship of the two time series is linear and global (e.g., the correlation at a low value is the same as the correlation at a high value). This is not true for performance metrics of a computer device, which often experiences a non-linear relationship.

3. Large volume: Many types of measurements can be obtained from a large number of data sources. For example, using Tivoli's ITM product, over 500 different resource metrics of an application server can be collected. It is quite common that a typical server farm consists of thousands of servers. This requires scalable algorithms in analyzing a large volume of temporal data in terms of both the large number of sampling points and the large number of types of measurements.

Currently there are many industrial products that handle business system monitoring and reporting, e.g. IBM Tivoli Business System Manager, IBM Tivoli Service Level Advisor, IBM Tivoli Monitor for Transaction Processing, BMC Patrol, etc. However, there is very little assistance or guidance that practitioners can get for business system monitoring designing. Therefore, traditional resource monitoring and event correlation have proven to be insufficient for understanding the overall service level.

Therefore a need exists to overcome the problems with the prior art as discussed above.

SUMMARY OF THE INVENTION

The present invention provides The present invention provides a system and method for identifying relevant metrics in a service level agreement. In one embodiment, the present invention selects a first set of points and a second set of points, where each set represents a given number of measurements for a different individual service metric. A first threshold value is set for the first set of points and a second threshold value is set for the second set of points. The first threshold value and the second threshold value are each selected so as to produce four quadrants and to maximize distribution of points of intersection of the first set of points and the second set of points between the second quadrant and the fourth quadrant.

In one embodiment, the first threshold value and the second threshold value are selected so as to produce the highest amount of mutual information at the intersection of the first set of points and the second set of points.

In other embodiments, the highest amount of mutual information at the intersection is identified by searching each intersection of the first set of points with the second set of points.

In still another embodiment, the highest amount of mutual information at the intersection is identified by calculating a first derivative of each of the first set of points with the second set of points at the intersection so as to find local maximums.

In some embodiments of the present invention a matrix is created, where the matrix has at least two axes that intersect. The first and the second axis each include a series of metrics. A highest amount of mutual information value resides at an intersection of each of the metrics in the matrix. In this embodiment, each amount of mutual information value is compared to a threshold and at least one metric from a set of intersecting metrics in the matrix is removed if the amount of mutual information value of the intersecting metrics exceeds the threshold.

In still another embodiment of the present invention, the threshold is chosen so as to minimize an investment needed to avoid exceeding the threshold.

Embodiments of the present invention include an input for receiving a plurality of sets of points, a selector for selecting a first sets of points and a second set of points from the sets of points, and a processor for setting a first threshold value for the first set of points and a second threshold value for the second set of points. The first threshold value and the second threshold value are selected to produce a set of quadrants so as to maximize distribution of points of intersection of the first set of points and the second set of points between the second quadrant and the fourth quadrant. The invention also includes an output for outputting the first threshold value and the second threshold value.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 9 is an SLA metrics dependency table populated with values found with the method of FIG. 8, in accordance with an embodiment of the present invention.

FIG. 10 is the SLA metrics dependency table of FIG. 9, reduced by removing one metric from highly correlated pairs of metrics, in accordance with an embodiment of the present invention.

DETAILED DESCRIPTION

Figure 1:
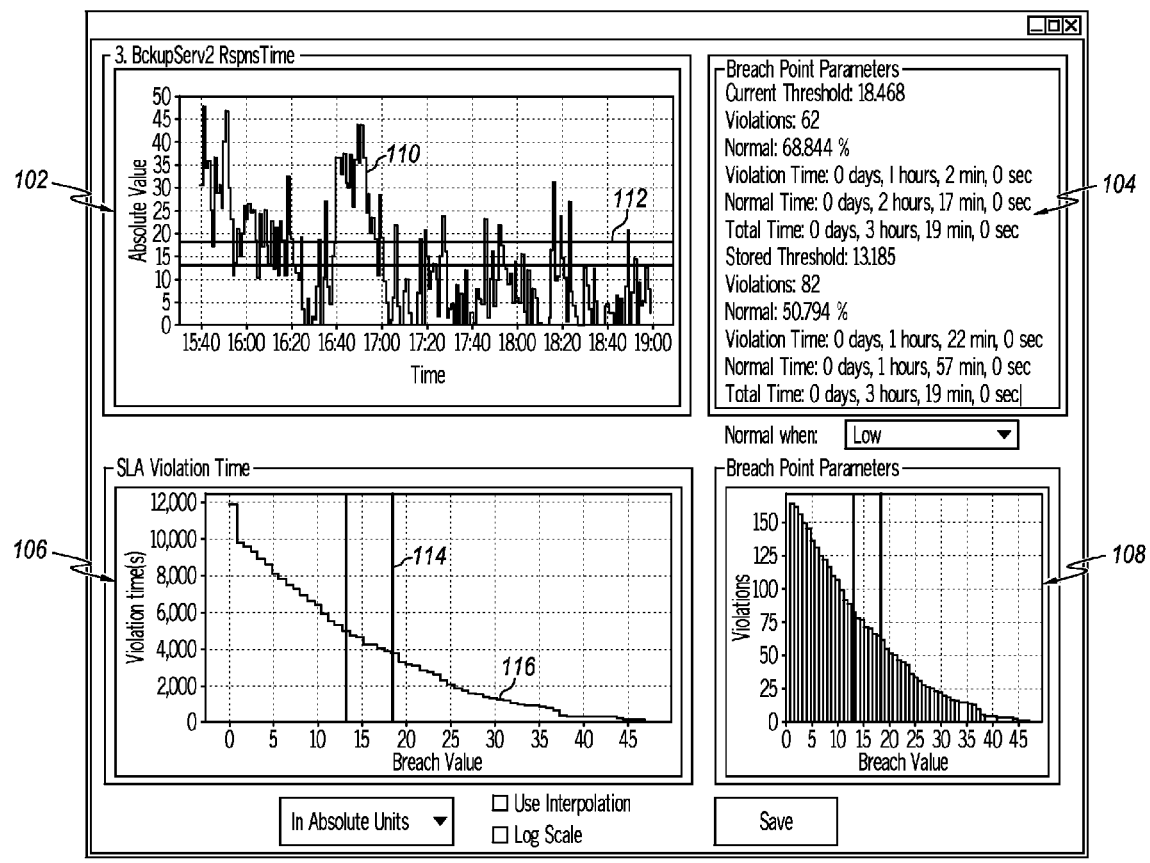
FIG. 1 is a screen shot of an interactive tool for breach point sensitivity analysis, in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward.

Described now is an exemplary method and hardware platform for performing the method according to an exemplary embodiment of the present invention. Embodiments of the present invention provide a Data Driven Business System Management (DDBSM) methodology that is, in one embodiment, a data analysis process that starts with acquiring metric data from a data repository and ends with a file containing a complete monitoring design for both service level and resource utilization. The metric analysis tool, according to the present invention, allows a user to automatically step through the process while retaining control in decision making.

Traditional monitoring design requires many different algorithms to accomplish the goals mentioned above. However, utilizing embodiments of the present invention, the goals can be achieved by one semiautomatic process—breach point sensitive analysis—and two automatic processes—relevance discovery and optimal threshold setting. The analysis areas are as follows:

1. Service Metric Selection: Service level selection finds a minimal set of service metrics that are sufficient for service level evaluation, or equivalently, to find service metrics whose values can be predicted without actually monitoring them. Specifically, some service metrics have a very rigid relationship with other metrics. For example, if a metric X is identical or keeps a fixed ratio with another metric Y, then X can be inferred from Y and hence monitoring of X can be discontinued and it will still be known how X performs. Metric Y is referred to as the "delegate" of metric X. The present invention is able to determine a minimal set of metrics that can delegate all service metrics, and is a direct application of relevance discovery.

2. Service Breach Point Setting: Service level breach points are usually products of subjective or even political decision. For example, for an online store, there is probably no convincing reason to suggest to the business owner that the breach point for end-to-end response time of his web site should be set to 1.3 seconds instead of 1.5 seconds in order to improve the shopping experience. Furthermore, it is likely that only a human can make such a decision. However, it is possible that, in practice, the average response time is above 1.3 seconds but rarely goes above 1.5 seconds. In such case, a major investment might be avoided by setting the breach point to 1.5 seconds instead of 1.3 seconds while the change is not perceivable to customers. This is an application of breach point sensitivity analysis. The term "investment" refers to any resource needed to affect the change in performance to meet a breach point. This can include hardware provision cost, utilization cost, upgrade cost, manpower costs, and others.

3. Resource Metric Selection: In additional to the delegating method mentioned in the section above entitled "1. service metric selection," resource metric selection can utilize additional information obtained from service metrics. The idea is that every monitored resource metric should reflect or predict a certain impact on the service level. Otherwise it is difficult to interpret the monitoring results. For example, if the CPU usage of a server stays close to 100% for a long time but in the mean time there is little service level degradation observed, then there is no strong reason to monitor this metric since there is no way to correctly interpret the metric value. In short, resource metric selection discovers the necessary and sufficient set of resource metrics that show clear service-resource dependency. This task is another application of relevance discovery.

4. Resource Metric Threshold Setting: A proper threshold value divides the metric value range into a good region and a bad region. Ideally, the metric falling into the bad region should be a precise predictor or indicator of service degradation. Essentially, the threshold setting is fixed so as to minimize both false positive and false negative readings. This task is an application of optimal threshold finding.

5. Bottleneck Resource Identification: A resource is a bottleneck resource of the service it supports if any of its metrics shows strong relevance with the service level. This is again an application relevance discovery. The present invention provides a relevance-discovery algorithm that can find the pairwise relevance of two metrics and the optimal threshold at the same time. This algorithm is possible because the present invention uses a drastic change point metric model, discussed below.

Breach Point Sensitivity Analysis

As previously stated, determining the service level breach point is a subjective matter. For example, if the response time breach point is currently set to 1.3 seconds, it is difficult to argue that 10 seconds is a better breach point. However, it is possible to suggest a minor adjustment like 1.5 seconds if it can save a significant amount of investment.

FIG. 1 is a screen shot of an interactive tool 100 for breach point sensitivity analysis, according to the present invention. The tool 100 is divided into four sections 102, 104, 106, and 108. The upper left plot 102 is a representation of the original metric over time. The lower left plot 106 shows the total amount of time with service-level violation for possible breach point values. The lower right plot 108 shows the number continuous periods corresponding to breach point values. A user can click on any of the three plots and set the breach point there. Lastly, the upper right plot 104 precisely shows the current breach point parameter settings.

The interactive tool 100 allows one to adjust service-level metric breach points for the best trade-off between service level and additional investment. Line 110 in the upper left plot 102 is a representation of the original service metric over time. The X-axis is time and the Y-axis is absolute value. Line 112 is a movable breach point line. A user can drag the line upward or downward to see the effect on threshold line 114 in the lower left plot 106.

In the lower left plot 106, a line 116 shows the relationship between breach point value (X-axis) and percentage of violation time (the percentage of time when the system is in unacceptable state (Y-axis)). The threshold line 114 is a movable line that is synchronized with line 112. When line 112 moves upward, line 114 moves to the right; when line 112 moves downward, line 114 moves to the left. This mechanism is especially effective when there are drastic changes in the chart. When a drastic change is present in the chart, a slight change in the breach point value can drastically change the amount of time with violations.

Metric Reduction and Dependency Analysis

The basic principle of metric reduction is to remove redundant metrics. A metric is redundant if its value can be inferred from the values of other metrics. A trivial but surprisingly common example of redundancy is identical metrics. Two methods are implemented by the present invention to identify redundancy: one is the statistical correlation and the other is the relevance measurement, both discussed below.

Using either of the methods, the present invention computes the correlation score of every pair of metrics and display a correlation matrix. All cells in the matrix with high correlation scores are candidates for removal. A user can manually remove a particular metric or have the present invention automatically orthogonalize the metric set. The dependency analysis is a cross-analysis of service level metrics and resource utilization metrics. For each selected service level metric, a resource utilization metric is identified as a relevant metric if it shows a high score by any of the correlation measurements. The threshold metric model for determining these scores will now be described.

The Drastic Change Point Metric Model

In computer systems, drastic changes in system performance are often observed when the utilization of some resources crosses a particular threshold. For example, when the allocated memory exceeds the physical memory size, the system has to start virtual memory paging which is much slower, and causes longer transaction response time. However, before the utilization reaches that point, the response time may not show significant correlation with the actual memory utilization because when memory utilization is in the lower region, the response time may be dominated by other factors. When memory utilization is in the higher region, the response time just doesn't not have strong correlation to response time. This same phenomenon is also observed for the impact of CPU and network bandwidth utilization on response time.

Figure 2:
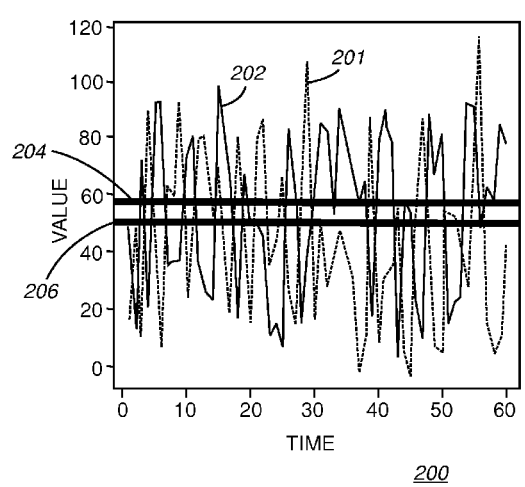
FIG. 2 is a graph showing correlation between two time series, in accordance with an embodiment of the present invention.
Figure 3:
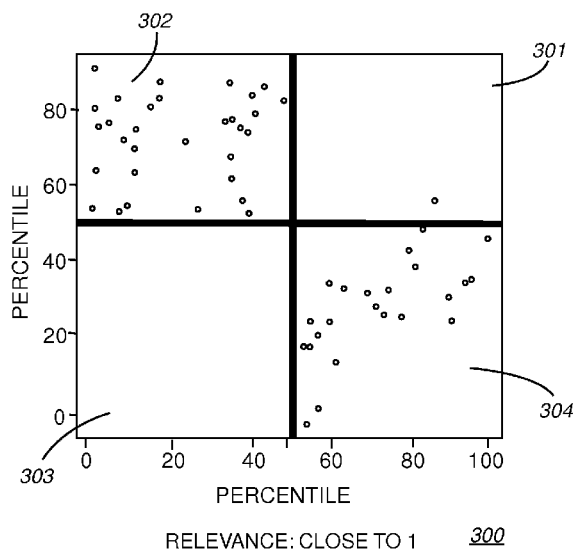
FIG. 3 is a graph showing relevance of two metrics, in accordance with an embodiment of the present invention.

FIGS. 2 & 3 illustrate an example of such relevance relationship. FIG. 2 shows a graph 200 of a first set of points 201 overlaid on a second points 202. Each set of points 201, 202 represents a given number of measurements for an individual metric measured over time. Each metric 201, 202 represented by the sets of points has a threshold value 204, 206, respectively.

A visual comparison of the two sets of points in FIG. 2 does not show strong correlation. However, the two time series can be represented in an X-Y plot 300 as in FIG. 3. Using the graph of FIG. 3, it is now possible to informally define the threshold relevance measurement. The relevance of two metrics is the best degree that they can be divided into diagonal regions as thresholds. That is to say, the possible value range of each metric is divided into a high region and a low region. Relevant metrics tend to be in a high region at the same time and in a low region at the same time as well. Conversely, the exact opposite is also true.

In the X-Y plot, the first threshold value 204 and the second threshold value 206 are selected so as to produce a set of quadrants 301, 302, 303, 304 so as to maximize the distribution of points of intersection of the first set of points 201 and the second set of points 202 between the second quadrant 302 and a fourth quadrant 304. Alternatively, the distribution of points of intersection could be maximized between the first quadrant 301 and a third quadrant 303. In one embodiment of the present invention, the first threshold value 204 and the second threshold value 206 are selected so as to produce the highest amount of mutual information at the intersection of the first set of points and the second set of points. The highest amount of mutual information at the intersection is identified by searching each intersection of the first set of points with the second set of points as will be described below and shown in FIGS. 9 and 10.

One situation that should be avoided is where the thresholds are set to high or low extremes. In such case, the values always fall in the same high or low region, hence, every pair of metrics are perfectly relevant. The measurement has to reward threshold settings that bifurcate the value range more evenly. Among all possible measurements studied, mutual information is chosen as the measurement for relevance. Before the mutual information of metrics is discussed, some definitions are helpful.

Definition 1 The bifurcation function $\beta$ is defined as $$B_\theta(x) = \begin{cases} \top & \text{if } x \geq \theta \\ \bot & \text{otherwise} \end{cases}$$

where $\theta$ is a real number.

Definition 2 Let $T=\langle t_1, \ldots, t_n \rangle$ be a time series and $\theta$ a real number, then the corresponding bifurcated time series $B_\theta(T) = \langle B_\theta(t_1), \ldots, B_\theta(t_n) \rangle$.

Now we can follow the classical information theory (taught in Thomas M. Cover and Joy A. Thomas. Elements of Information Theory. Wiley-Interscience, 1991) to define the entropy of a bifurcated time series and the mutual information of two bifurcated time series.

Definition 3 Given a bifurcated time series $T_\theta = \langle s_1 \ldots s_n \rangle$, its entropy is defined as $$\sum_{x \in \{\top, \bot\}} p(t_i = x) \log p(t_i = x)$$

where $p(t_i = x) = \|\{s_i \in T_\theta | t_i = x\}\| / \|T_\theta\|$.

Note that the entropy is bounded as shown in FIG. 4(a).

Definition 4 Given two time series $S = \langle s_1 \ldots s_n \rangle$ and $T = \langle t_1 \ldots t_n \rangle$, and their bifurcating thresholds $\theta_s$ and $\theta_t$, the mutual information of the bifurcated time series is defined as $$I_{S,T}(\theta_s, \theta_t) = \sum_{x \in \{\top, \bot\}} \sum_{y \in \{\top, \bot\}} p(B_{\theta_s}(s_i) = x, B_{\theta_t}(t_i) = y) \log \frac{p(B_{\theta_s}(s_i) = x, B_{\theta_t}(t_i) = y)}{p(B_{\theta_s}(s_i) = x) p(B_{\theta_t}(t_i) = y)}.$$

Figure 5:
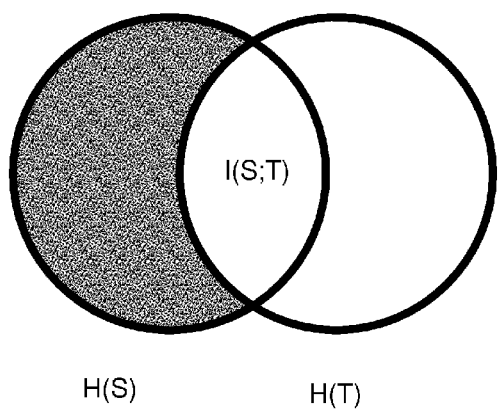
FIG. 5 is a graph showing the relationship of mutual information and entropy, in accordance with an embodiment of the present invention.
Figure 4:
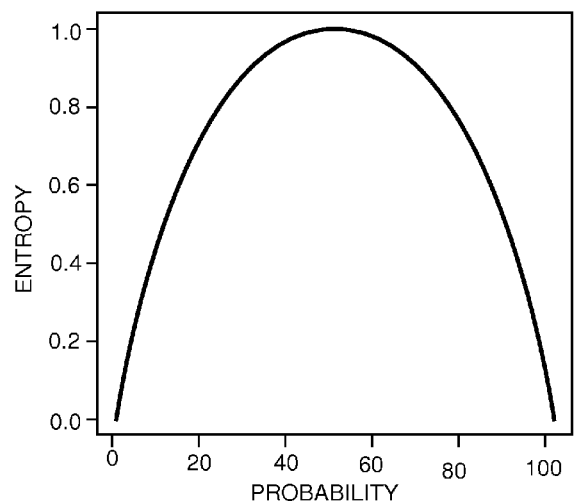
FIG. 4 is a graph showing entropy of a bifurcated set of metrics, in accordance with an embodiment of the present invention.

FIGS. 4 & 5 show the relationship between entropy of individual sets (FIG. 4) and mutual information (FIG. 5). FIG. 4 maps probability (X-axis) vs. entropy (Y-axis) and graphically shows that the highest entropy value is at a point where probability is at 50%. This represents a threshold setting where half of the values would fall above the threshold and half of the values would fall below the threshold. On the extremes, if the threshold is set way too high, no points will violate it, which results in both a probability and entropy value of zero. One the other hand, if the threshold is set so low that all instances of the system will violate the threshold value, i.e. the probability is 100%, the entropy is again zero, indicating a complete lack of uncertainty.

FIG. 5 shows two overlapping sets H(S) and H(T). The area defined by the overlap I(S;T) represents mutual information. As can be seen in FIG. 5, the mutual information is always less than the entropy of an individual set and entropy is small on either extreme. Using mutual information as the relevance measurement naturally leads away from setting the threshold to any extreme of the value range. It is now possible to give the problem a formal description.

Problem 1 (Relevance Discovery)

Let S and T be two time series and find $\theta_s$ and $\theta_t$ that maximize $I(B_{\theta_s}(S); B_{\theta_t}(T))$. To simplify the notation, S and T are omitted in the following discussion when there is no ambiguity. Additionally, $I(\theta_s, \theta_t) = I(B_{\theta_s}(S); B_{\theta_t}(T))$.

Relevance Discovery Algorithm

Now that the thresholds $\theta_s$ and $\theta_t$ are known, computing mutual information is straightforward. The algorithm below uses a two-level nested loop to find the two optimal thresholds. Finding mutual information for each pair of thresholds requires one scan of the time series.

Algorithm 1 Main(S, T)

Input: metrics S and T

Output: Thresholds $\theta_s$ and $\theta_t$ that locally maximize $I(S_{\theta_s}; T_{\theta_t})$ $\theta_{s_0} \leftarrow$ medium of S $\theta_{t_0} \leftarrow$ medium of T $i \leftarrow 0$ while $I(\theta_{s_i}, \theta_{t_i}) < \max\{I(\theta_{s_i}^+, \theta_{t_i}^+), I(\theta_{s_i}^+, \theta_{t_i}^-), I(\theta_{s_i}^-, \theta_{t_i}^+), I(\theta_{s_i}^-, \theta_{t_i}^-)\}$ do $\theta_{s_{i+1}} \leftarrow \theta_{s_i} - I'(\theta_{s_i}, \theta_{t_i}) / I_x'(\theta_{s_i}, \theta_{t_i})$ $\theta_{t_{i+1}} \leftarrow \theta_{t_i} - I'(\theta_{s_i}, \theta_{t_i}) / I_y'(\theta_{s_i}, \theta_{t_i})$ $i \leftarrow i+1$ end while For most data sets, $I(\theta_s, \theta_t)$ has a relatively smooth surface and a small number of maxima.

Figure 6:
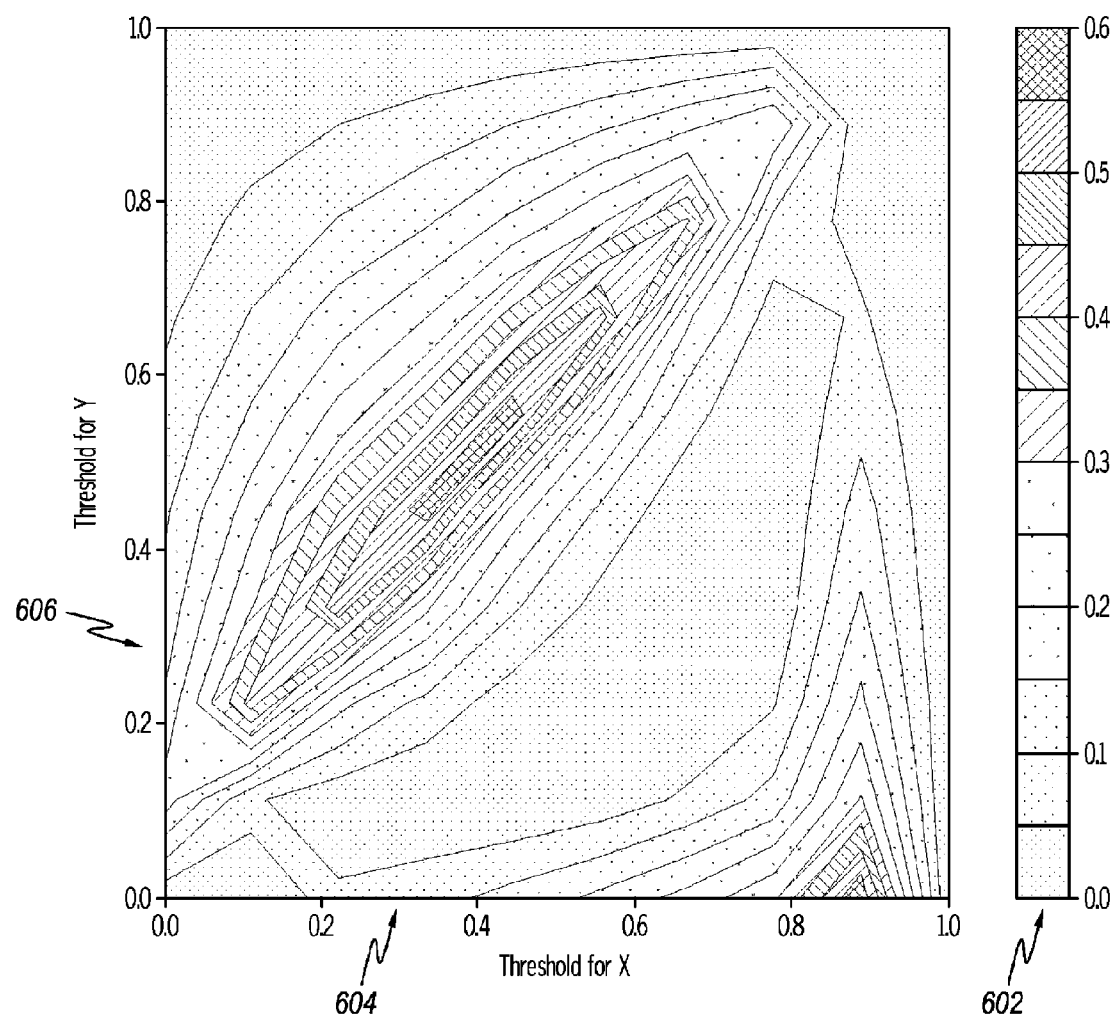
FIG. 6 is a contour plot of mutual information, in accordance with an embodiment of the present invention.

FIG. 6 is a contour plot of mutual information and graphically shows a typical shape of relevance measurement. The X-axis 604 is a set of threshold values for a first metric measured over time and the Y-axis 606 is a set of threshold values for a second metric measured over time. The scale 602 on the right of the graph is a key to the value of the relevance at each point on the graph. By letting $$I'(\theta_s, \theta_t) = \frac{\partial^2 I(\theta_s, \theta_t)}{\partial \theta_S \partial \theta_T},$$

then the solution $(\theta_s^*, \theta_t^*)$ must satisfy $$I''(\theta_s^*, \theta_t^*) = \frac{\partial^2 I'(\theta_s^*, \theta_t^*)}{\partial \theta_s^* \partial \theta_t^*} = 0$$

$$I''_{\theta_s}(\theta_s^*, \theta_t^*) = \frac{\partial^3 I'(\theta_s^*, \theta_t^*)}{\partial \theta_s^* \partial \theta_t^*} \leq 0$$

$$I''_{\theta_t}(\theta_s^*, \theta_t^*) = \frac{\partial^3 I'(\theta_s^*, \theta_t^*)}{\partial \theta_s^* \partial^2 \theta_t^*} \leq 0$$

Figure 7:
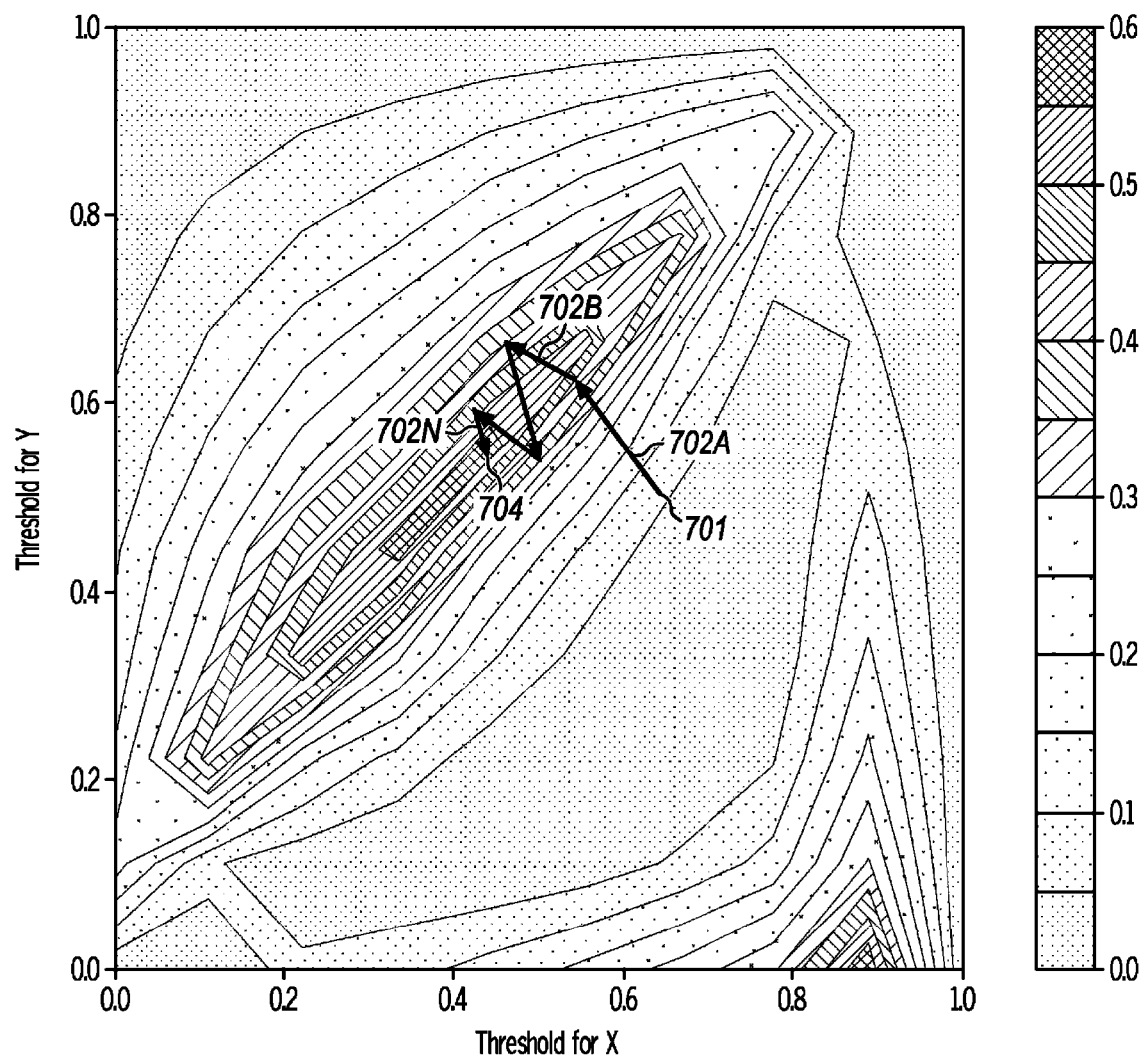
FIG. 7 is a graph showing the "hill climbing" method of determining relevance between two metrics, in accordance with an embodiment of the present invention.

The problem can be solved by known iterative methods like Newton's method for root finding. Note the function to find the root is I' instead of I. FIG. 7 shows a sketch of the algorithm. The initial point is set to the medians $(\theta_{s_o}, \theta_{t_o})$ because a bifurcated set has the maximal entropy when the two parts are equal in size. The most expensive computation here is to compute $I(\theta_{s_i}, \theta_{t_i}), I'(\theta_{s_i}, \theta_{t_i}), I'_{\theta_s}(\theta_{s_i}, \theta_{t_i}), \ldots$ etc. The concept of $$f'(x_i) = \frac{f(x_i + \Delta x) - f(x_i)}{\Delta x},$$

and $f''(x_i) = f'(x_i \Delta x) - f'(x_i)$ is used to get the value. However, if $\Delta\theta_s$ and $\Delta\theta_t$ are small and the data is sparse, there might not be any point that falls into the area to make any difference. The strategy of the present invention is to use the n-th nearest neighbors to dynamically define $\Delta\theta_s$ and $\Delta\theta_t$. This method is shown by the progressively increasing vectors 702a-n shown in FIG. 7. The method is referred to as "hill climbing" and is used to find zeros on the surface of the directive of relevance. For instance, the process starts with point 701 and travels uphill in a direction represented by vector 702a. Once a maxima is reached traveling along vector 702a, the process searches adjacent surfaces for an increase in height. Once the increase is located, the process continues along a vector 702b in that direction until another maxima is reached. The process continues on until the last vector 702n reaches a point 704, where no adjacent surfaces are greater in height. Point 704 represents the relevance value of the two metrics. In other words, the highest amount of mutual information at each point, which is the intersection of the two sets of points shown in FIG. 2, is identified by calculating a first derivative of each of the first set of points with the second set of points at the intersection to find local maximums.

In rare cases, the algorithm may converge with very low mutual information on a local hill. In such cases, the algorithm restarts from a different initial point. Several iterations can be run, starting from different locations on the graph, until two or more iterations arrive at the same zero point that is the highest found point on the graph. This algorithm usually converges fast and is two magnitudes faster than the algorithm above.

Figure 8:
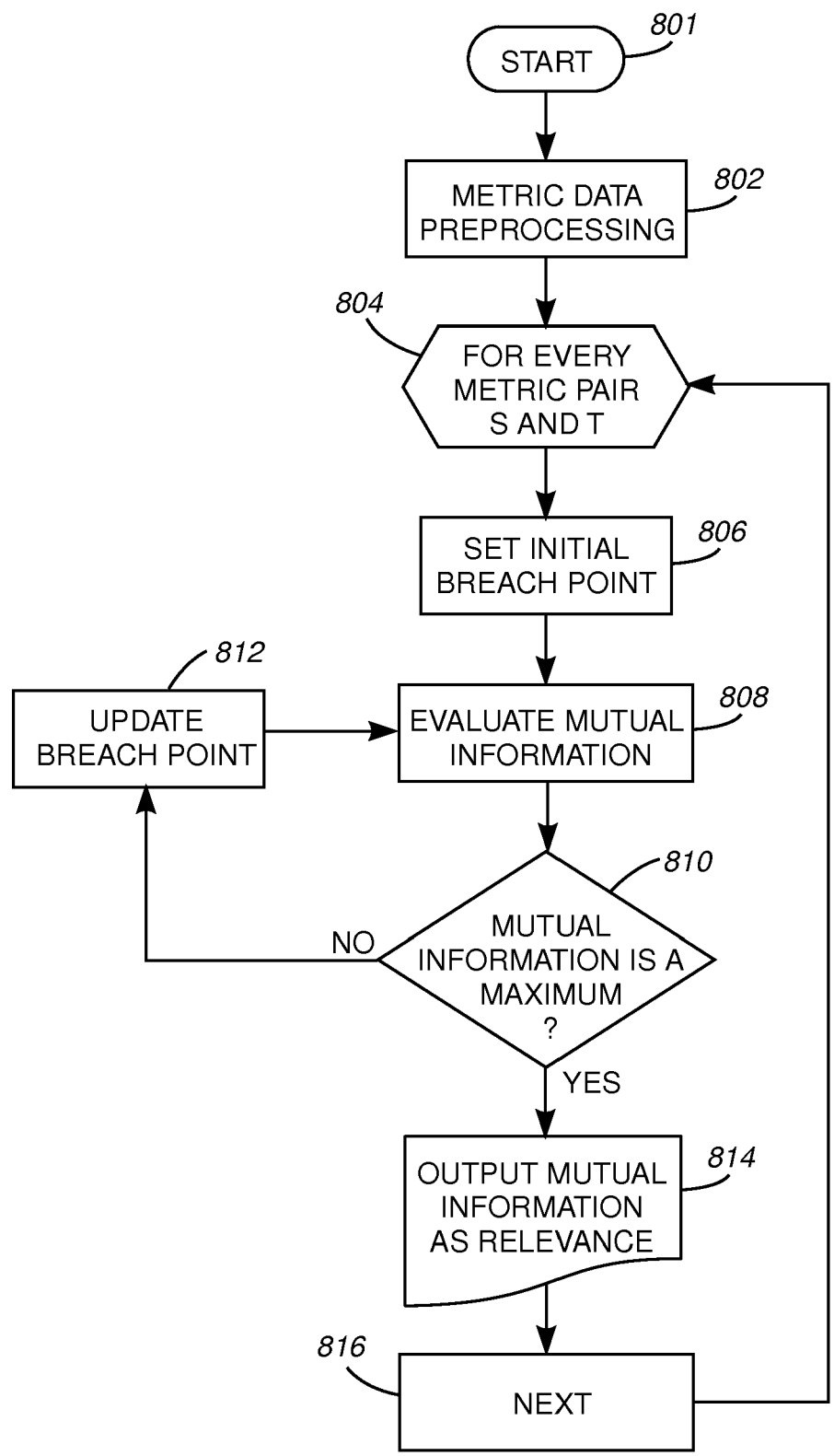
FIG. 8 is a process flow diagram illustrating a method of outputting mutual information as relevance, in accordance with an embodiment of the present invention.

FIG. 8 shows a process flow 800 according to the present invention. The flow starts at step 801 and move directly to 802 where the metric data is pre-processed. Pre-processing includes data cleaning, outliner removal, synchronization by interpolation, and the like. The flow then moves to step 804, which is a loop over every pair of the metrics. In step 806 the breach points in each metric are set to be the median value of the metric. The flow then moves to step 808 where the real valued metrics are transformed to binary valued sequences and the mutual information is calculated. Next, in step 810, it is determined whether the mutual information is a maximum. In this step, for each of the breach points, two extra points are chosen such that one is slightly above the breach point and one is slightly below the breach point. Then, 2 points of each metric are paired up to form 4 2-dimensional points. If the mutual information of the 4 neighbor points is all lower than one of the breach points, this point is a maximum.

If the determination of step 810 is that the current point is not a maximum, then the flow moves to step 812, where the breach point is adjusted toward the direction of the neighbor point and the flow returns to step 808. If the result of the determination of step 810 is yes, the flow moves to step 814 where the mutual information is output as the relevance measurement. The flow then moves back up to step 816 where new metrics are chosen and the flow returns to step 804.

FIG. 9 shows an SLA metric dependency matrix 900. The matrix 900 has both rows 902 and columns 904 of metrics. The metrics in columns 904 are the same metrics as appear in the rows 902. The cells where the rows 902 and columns 904 intersect hold the calculated highest amount of mutual information value computed in the process shown in FIG. 8. Intersecting cells of the same metric are left blank. Cells containing a high absolute value (close to 1 or above a certain pre-set threshold) represent the metric pairs that are highly relevant, and hence one of the metrics is redundant. In an embodiment of the present invention, the table 900 is a GUI having a button 906 that, upon clicking, instructs the underlying software to iteratively remove one of the metrics in these highly correlated pairs that are above a particular threshold. The result is a reduced set of metrics, shown in table 1000 of FIG. 10. This resulting table 1000 contains only those metrics that are not highly correlated with other metrics.

The hardware platform includes a computer system.

Generalized Architecture for a Computer System

Figure 11:
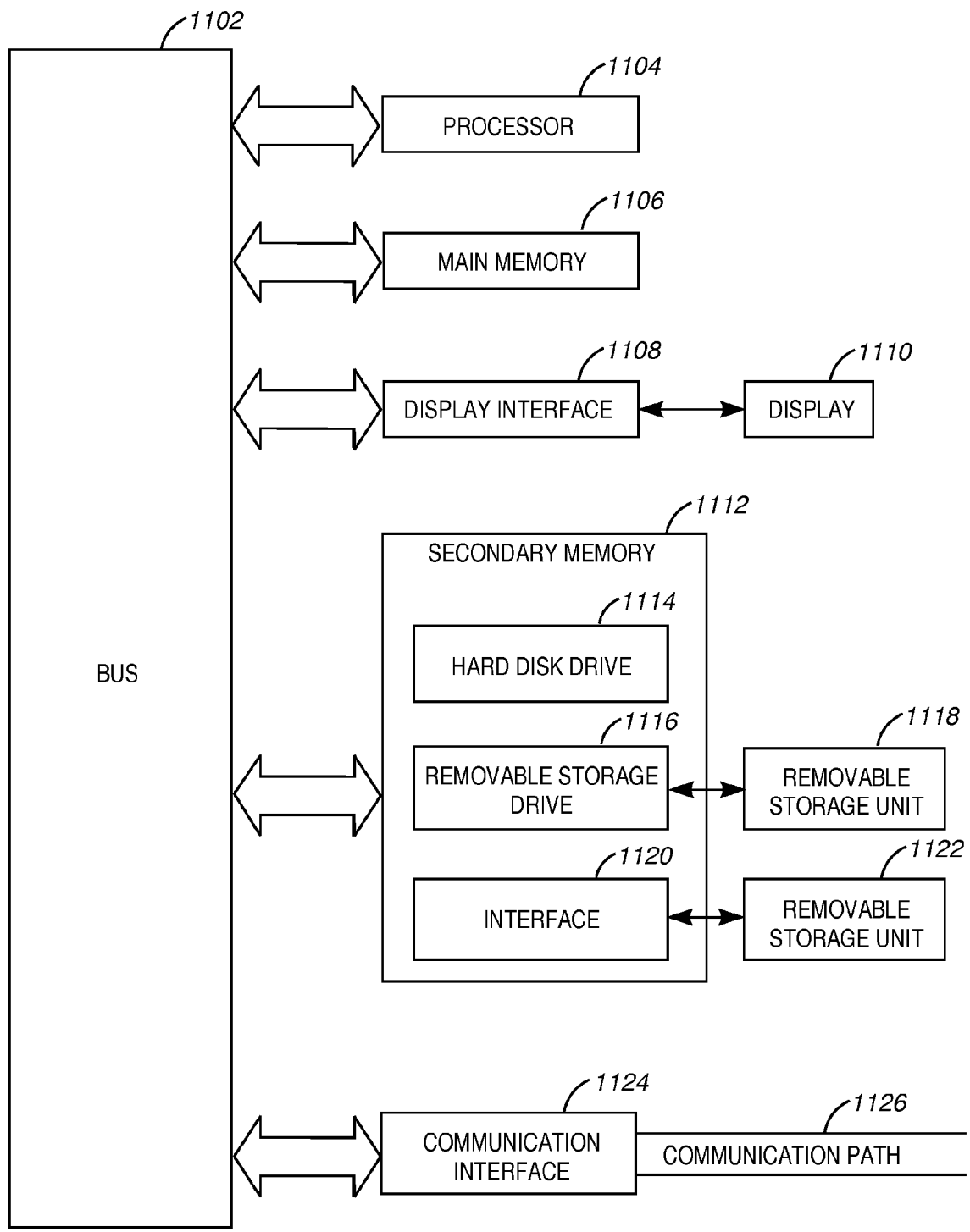
FIG. 11 is a hardware block diagram illustrating one embodiment of a computer system.

FIG. 11 is a block diagram of a computer system useful for implementing an embodiment of the present invention. The computer system includes one or more processors, such as processor 1104. The processor 1104 is connected to a communication infrastructure 1102 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1108 that forwards graphics, text, and other data from the communication infrastructure 1102 (or from a frame buffer not shown) for display on the display unit 1110. The computer system also includes a main memory 1106, preferably random access memory (RAM), and may also include a secondary memory 1112. The secondary memory 1112 may include, for example, a hard disk drive 1114 and/or a removable storage drive 1116, representing a floppy disk drive, a magnetic tape drive, an optical disk drive, etc. Removable storage drive 1116, reads and writes to a floppy disk, magnetic tape, optical disk, etc., storing computer software and/or data. The system also includes a resource table 1118, for managing resources $R_1$-$R_n$ such as disk drives, disk arrays, tape drives, CPUs, memory, wired and wireless communication interfaces, displays and display interfaces, including all resources shown in FIG. 11, as well as others not shown.

In alternative embodiments, the secondary memory 1112 may include other similar means for allowing computer programs or other instructions to be loaded into the computer system. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to the computer system.

The computer system may also include a communications interface 1124. Communications interface 1124 allows software and data to be transferred between the computer system and external devices. Examples of communications interface 1124 may include a modem, a network interface (such as an Ethernet card), a communications port, a PCMCIA slot and card, etc. Software and data transferred via communications interface 1124 are in the form of signals which may be, for example, electronic, electromagnetic, optical, or other signals capable of being received by communications interface 1124. These signals are provided to communications interface 1124 via a communications path (i.e., channel) 1126. This channel 1126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1106 and secondary memory 1112, removable storage drive 1116, a hard disk installed in hard disk drive 1114, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1106 and/or secondary memory 1112. Computer programs may also be received via communications interface 1124. Such computer programs, when executed, enable the computer system to perform the features of the present invention as discussed herein. In particular, the computer programs, when executed, enable the processor 1104 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A computer implemented method for identifying relevant metrics, the method comprising:
   a computer processor configured to perform:
   selecting, for each pair of individual service metrics in a plurality of individual service metrics, at least a first set of points representing a given number of measurements for a first individual service metric in the pair of individual service metrics;
   selecting a second set of points representing a given number of measurements for a second individual service metric in the pair of individual service metrics;
   setting a first threshold value for the first set of points;
   setting a second threshold value for the second set of points,
   whereby the first threshold value and the second threshold value are selected to produce a set of quadrants that maximizes a distribution of points of an intersection of the first set of points and the second set of points between at least one of a group comprising a second quadrant and a fourth quadrant and a group comprising a first quadrant and a third quadrant;
   determining, based on the first threshold value and the second threshold value, a highest amount of mutual information value between the first and second individual service metrics;
   creating a matrix comprising at least two axes that intersect, where a first and second axis each comprises a series of individual service metrics from the plurality of individual service metrics, wherein each pair of intersecting individual service metrics from the first and second axes comprises the highest amount of mutual information value between the individual service metrics from the first and second axes;
   comparing, for each pair of intersecting individual service metrics, the highest amount of mutual information value to a threshold;
   identifying, in response to the highest amount of mutual information value exceeding the threshold, the pair of intersecting individual service metrics as a set of relevant metrics; and
   removing, in response to identifying the pair of intersecting individual service metrics as a set of relevant metrics, at least one individual service metric from the pair of intersecting service metrics.

2. The computer implemented method according to claim 1, wherein:
   the first threshold value and the second threshold value are selected so as to produce the highest amount of mutual information value at the intersection of the first set of points and the second set of points.

3. The computer implemented method according to claim 2, wherein:
   the highest amount of mutual information value at the intersection is identified by searching each intersection of the first set of points with the second set of points.

4. The computer implemented method according to claim 2, wherein:
   the highest amount of mutual information value at the intersection is identified by calculating a first derivative of each of the first set of points with the second set of points at the intersection to find local maximums.

5. The computer implemented method according to claim 4, wherein:
   the threshold is chosen so as to minimize an investment needed to avoid exceeding the threshold.

6. A system for identifying relevant metrics, the system comprising:
   a memory; and a processor communicatively coupled to the memory, the processor for:

selecting, for each pair of individual service metrics in a plurality of individual service metrics, at least a first set of points representing a given number of measurements for a first individual service metric in the pair of individual service metrics;

selecting a second set of points representing a given number of measurements for a second individual service metric in the pair of individual service metrics;

setting a first threshold value for the first set of points;

setting a second threshold value for the second set of points, whereby the first threshold value and the second threshold value are selected to produce a set of quadrants that maximizes a distribution of points of an intersection of the first set of points and the second set of points between at least one of a group comprising a second quadrant and a fourth quadrant and a group comprising a first quadrant and a third quadrant;

determining, based on the first threshold value and the second threshold value, a highest amount of mutual information value between the first and second individual service metrics;

creating a matrix comprising at least two axes that intersect, where a first and second axis each comprises a series of individual service metrics from the plurality of individual service metrics, wherein each pair of intersecting individual service metrics from the first and second axes comprises the highest amount of mutual information value between the individual service metrics from the first and second axes;

comparing, for each pair of intersecting individual service metrics, the highest amount of mutual information value to a threshold;

identifying, in response to the highest amount of mutual information value exceeding the threshold, the pair of intersecting individual service metrics as a set of relevant metrics; and removing, in response to identifying the pair of intersecting individual service metrics as a set of relevant metrics, at least one individual service metric from the pair of intersecting service metrics.

7. The system according to claim 6, wherein:

the first threshold value and the second threshold value are selected by the processor so as to produce the highest amount of mutual information value at the intersection of the first set of points and the second set of points.

8. The system according to claim 7, wherein:

the highest amount of mutual information value at the intersection is identified by searching each intersection of the first set of points with the second set of points.

9. The system according to claim 7, wherein:

the highest amount of mutual information value at the intersection is identified by calculating a first derivative of each of the first set of points with the second set of points at the intersection to find local maximums.

10. The system according to claim 9, wherein:

the threshold is chosen so as to minimize an investment needed to avoid exceeding the threshold.

11. A non-transitory computer readable storage medium for identifying relevant metrics, the computer readable storage medium comprising:

a storage medium readable by a processing circuit and storing instructions for execution by the processing circuit for performing a method comprising:

creating a matrix comprising at least two axes that intersect, where a first and second axis each comprises a series of individual service metrics from a plurality of individual service metrics, wherein each pair of intersecting individual service metrics from the first and second axes comprises a relevance value indicating a relevancy between the individual service metrics from the first and second axes;

comparing, for each pair of intersecting individual service metrics, the relevance value to a threshold;

identifying, in response to the relevance value exceeding the threshold, the pair of intersecting individual service metrics as a set of relevant metrics; and removing, in response to identifying the pair of intersecting individual service metrics as a set of relevant metrics, at least one individual service metric from the pair of intersecting service metrics;

selecting, for each pair of individual service metrics in a plurality of individual service metrics, at least a first set of points representing a given number of measurements for a first individual service metric in the pair of individual service metrics;

selecting a second set of points representing a given number of measurements for a second individual service metric in the pair of individual service metrics;

setting a first threshold value for the first set of points;

setting a second threshold value for the second set of points, whereby the first threshold value and the second threshold value are selected to produce a set of quadrants that maximizes a distribution of points of an intersection of the first set of points and the second set of points between at least one of a group comprising a second quadrant and a fourth quadrant and a group comprising a first quadrant and a third quadrant; and determining, based on the first threshold value and the second threshold value, the relevance value associated with the first and second individual service metrics.

12. The computer readable storage medium according to claim 11, wherein:

the first threshold value and the second threshold value are selected so as to produce the highest amount of mutual information at the intersection of the first set of points and the second set of points.

13. The computer readable storage medium according to claim 12, wherein:

the highest amount of mutual information at the intersection is identified by searching each intersection of the first set of points with the second set of points.

14. The computer readable storage medium according to claim 12, wherein:

the highest amount of mutual information at the intersection is identified by calculating a first derivative of each of the first set of points with the second set of points at the intersection to find local maximums.

15. The computer readable storage medium according to claim 14, wherein:

the threshold is chosen so as to minimize an investment needed to avoid exceeding the threshold.

* * * * *